Dec. 30, 1930.  C. G. STRANDLUND  1,787,127

PLOW

Filed Nov. 12, 1928

INVENTOR.
Carl G. Strandlund
BY Brown, Jackson, Boettcher
& Diener
ATTORNEYS.

Patented Dec. 30, 1930

1,787,127

UNITED STATES PATENT OFFICE

CARL G. STRANDLUND, OF MOLINE, ILLINOIS, ASSIGNOR TO DEERE & COMPANY, OF MOLINE, ILLINOIS, A CORPORATION OF ILLINOIS

PLOW

Application filed November 12, 1928. Serial No. 318,630.

The present invention relates generally to wheeled plows, and has particular reference to an improved mounting of the rear furrow wheel on the implement, and to improved lifting mechanism for raising and lowering the rear portion of the implement relatively to said rear furrow wheel.

The general object of the invention is to provide such a mounting characterized by lifting mechanism which is operable to raise and lower the rear portion of the implement relatively to the rear furrow wheel independently of any raising or lowering of the front portion of the implement relatively to the other wheels. Such arrangement provides a simple and inexpensive construction for raising the rear end of the implement to transport position, and also has the further advantage of enabling the rear plow bottom to be used as a brake when the implement is being transported. This braking feature is of considerable utility in those instances where the plow is pulled by animals without using a pole for steering or stopping the implement.

When a plow having this form of draft is being transported downhill, it is essential that the implement be retarded, and such is provided for in the present construction which permits the rear plow bottom to be lowered for dragging on the ground as a brake element without lowering the other plow bottoms into contact with the ground.

Other objects concerned with the detailed structure of the furrow wheel mounting will be apparent from the following description of a preferred embodiment of the invention. In the accompanying drawing illustrating such embodiment:

Figure 1:
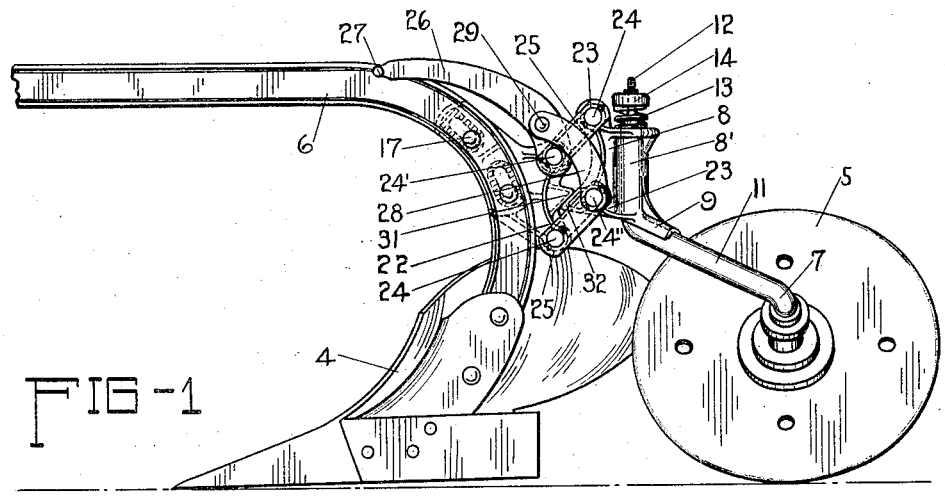
Fig. 1 is a side elevational view of the rear portion of the implement, showing the position assumed by the furrow wheel mounting when the rear plow bottom is lowered.

The rear plow bottom is indicated at 4 and the rear furrow wheel at 5. Both are mounted on a supporting frame member or other supporting portion of the implement represented by the curved plow beam 6. The furrow wheel is journaled on the downwardly inclined spindle end of an axle 7 which has swiveled mounting for castering movement in a mounting member 8. Preferably, restraining means is associated with the mounting member 8 for normally holding the axle 7 in a definite position with the rear furrow wheel 5 in plowing alinement. Such restraining means may comprise a lug 9 projecting from the lower end of the mounting member 8 and having a recessed under surface which partially embraces the rounded upper surface of the forwardly and upwardly extending axle arm 11.

The engagement of the restraining lug 9 over the axle arm 11 normally holds the caster wheel 5 in plowing alinement behind the rear plow bottom 4 except when the implement is being turned at the end of the field, when the lateral turning pressure exerted against the furrow wheel is sufficient to cam the axle arm 11 out of the recess in the under side of the lug 9, whereupon the axle can swing freely with a castering movement. When the implement is brought back into plowing alinement and moves forwardly the castering wheel returns automatically into plowing alinement with the result that the restraining lug 9 again resumes its restraining engagement over the upper side of the axle arm 11. The pivot standard 12 at the front end of the axle arm 11 has rotatable and vertically reciprocable mounting in the boss 8' of the mounting member 8. A compression spring 13 surrounds the pivot standard 12, having its lower end engaging with the bearing boss 8' and having its upper end engaging with an adjustable collar 14 by which the pressure of the spring may be adjusted. The pressure of said spring aids in holding the axle arm 11 up in restraining engagement with the recessed under surface of the lug 9.

The mounting member 8 is connected with the supporting member 6 of the implement through parallel link mechanism which affords a parallel or vertical translatory movement between the mounting member and the plow beam in the operation of lifting the plow. Clamped to the plow beam 6 is a bracket 16 with which the front ends of the links have pivotal connection. The mounting of such bracket is adjustable to adjust the height of the rear furrow wheel 5 with reference to the plow bottom 4 when plowing in different soils and under different conditions, and also to compensate for variations of manufacture.

Figure 3:
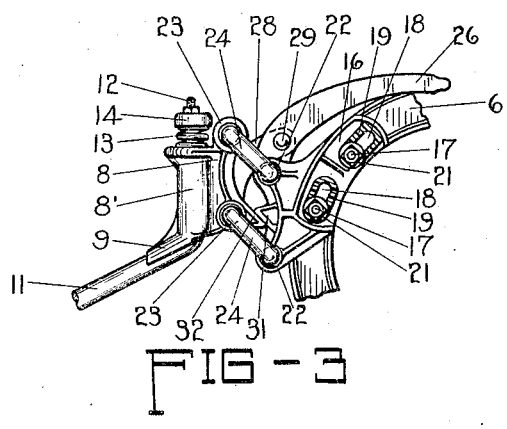
Fig. 3 is a fragmentary view of the furrow wheel mounting as viewed from the opposite side of the implement.

It will be noted from Fig. 3 that two bolts 17 extend through the plow beam and pass through slots 18 in the bracket 16. Formed on the sides of said slots are notches or serrations 19, and mounted on each bolt 17 for engagement with these serrations are serrated collars or blocks 21. It will be evident that by loosening the bolts 17 and disengaging the serrated collars 21 from the serrations 19 the bracket 16 can be shifted to different points of vertical adjustment on the plow beam 6, and that upon retightening the bolts 17 the serrated blocks 21 will cooperate with the serrations 19 in rigidly holding the bracket in its given adjustment.

Figure 2:
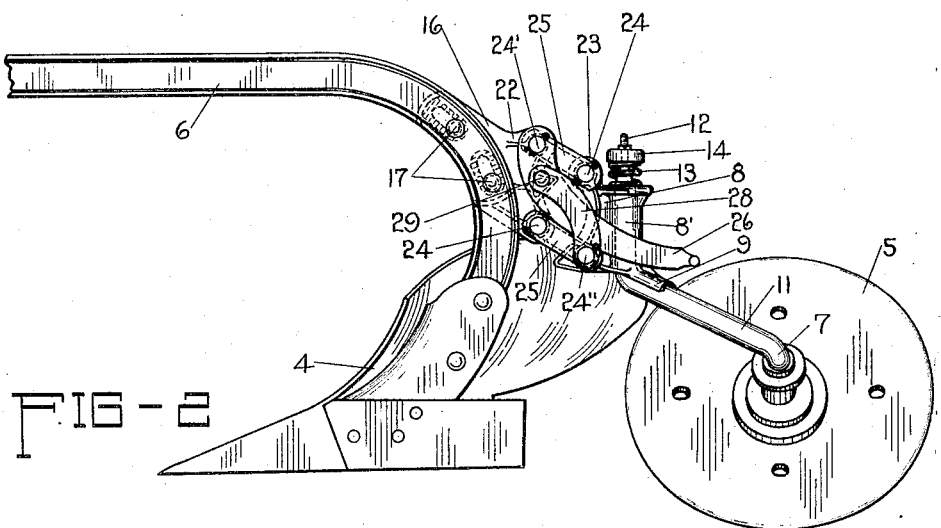
Fig. 2 is a similar view showing the position of the mounting when the rear plow bottom is raised.

Formed in the rear portion of said bracket are two vertically spaced, transversely extending pivot bosses 22, 22. Formed in the front portion of the mounting member 8 are two similar pivot bosses 23, 23. The mounting link mechanism comprises two links 24, 24 constructed of round bar stock and bent into substantially U shaped outline. The parallel portions of the upper link are passed through the upper bosses 22 and 23, and the parallel portions of the lower link are similarly passed through the lower bosses 22 and 23. The ends of the links project from the opposite sides of the bosses (Figs. 1 and 2) and receive link bars 25 which are apertured to engage over the projecting ends of the U-shaped links, said link bars 25 being retained on said projecting ends by cotter pins or any other suitable securing means. The links 24, 25 remain parallel in all vertical positions of the plow, swinging with the motion of a jointed parallelogram with the result that the relative movement between the rear portion of the plow and the rear furrow wheel is substantially vertically rectilinear or parallel.

The pivot bosses 22 and 23 are comparatively wide, thereby affording a long area of bearing support, and by providing connecting link portions at both sides or ends of these bosses the wheel supporting member 8 is given a staunch, durable mounting capable of resisting all lateral and twisting stresses to which the furrow wheel 5 may be subjected.

The lifting mechanism comprises a long curved lever 26 which is pivotally mounted on the projecting front end of the upper U-shaped link 24, said pivot point being indicated at 24'. A handle 27 extends laterally from the swinging end of the lever 26. A curved link 28 is pivotally connected at its upper end to the lever 26 on a pivot pin 29 which is located in comparatively close proximity to the pivotal center 24' of the lever. The lower end of such link is pivotally mounted on the laterally projecting rear end of the lower U-shaped link 24, such pivotal point being indicated at 24''. The arrangement and pivotal mounting of the lever and link are such that these two members have the operating characteristic of a pair of toggle links. When the lifting lever 26 occupies the position illustrated in Fig. 1 the elevated position of the toggle pivot 29 allows the two pivot centers 24' and 24'' to swing into proximity to each other, with the result that the plow bottom 4 is permitted to lower relatively to the rear furrow wheel. Swinging the lifting lever 26 backwardly and downwardly functions to straighten out the toggle links, bringing the two links approximately into alinement and causing the pivotal centers 24' and 24'' to be separated, with the result that the rear end of the plow is raised relatively to the rear furrow wheel.

In the lifting operation the lever 26 is swung backwardly and downwardly until it strikes the laterally projecting end 24'' of the lower link 24 (Fig. 2), which projecting end functions as a stop for the lever. In this position the knuckle joint pivot 29 of the toggle has been carried over center, that is to say, it has been carried past a straight line extending between the upper and lower pivots 24' and 24'' of the toggle linkage. Hence the linkage is locked in this position, holding the rear end of the plow raised to transport position until the lever 26 is swung upwardly and forwardly to its former position illustrated in Fig. 1. Such latter movement breaks the knuckle joint of the toggle, allowing the two pivot centers 24' and 24'' to swing toward each other and thereby lowering the rear end of the plow. The plow drops to a predetermined position with respect to the rear furrow wheel 5, determined by the engagement of two stops 31 and 32 on the bracket 16 and on the wheel carrying member 8 respectively. The stop 31 consists of a projecting lug extending from the rear of the bracket 16 between the pivot bosses 22 and having a sloping lower surface. The other stop 32 consists of a projecting lug extending from the wheel carrying member 8 in proximity to the lower pivot boss 23 and having a sloping upper surface adapted to contact with the sloping lower surface of the companion stop 31. The engagement of these two stop projections accurately predetermines the lowered position of the plow bottom 4 with reference to the rear furrow wheel 5.

It will be seen from the foregoing that the present lifting mechanism permits the rear portion of the implement to be lowered independently of the lowering of the front portions of the implement with reference to the front furrow wheel and land wheel.

This enables the rear plow bottom to be employed as a brake for retarding the motion of the implement in transport and particularly when traveling downhill. As previously described, the toggle link construction of lifting mechanism has the further advantage of automatically locking the rear portion of the plow in raised position. The parallel link connection between the wheel mounting member 8 and the plow beam affords a parallel or vertically rectilinear movement between these parts, giving a high lift to the plow and also resulting in the bearing boss 8' being maintained substantially vertical in both the raised and lowered positions of the plow, which permits of easier castering movement of the rear furrow wheel when the implement is being turned.

Having thus described my invention, what I claim as new and desire to secure by Letters Patent is:

1. In a plowing implement, the combination of a supporting member, a plow carried thereby, a bracket having vertically spaced slots therein, bolts passing through said slots and through said supporting member for securing said bracket thereto, serrations on said bracket adjacent to said slots and cooperating with said bolts for holding said bracket in different vertical adjustments relatively to said supporting member, upper and lower horizontal pivot bosses on said bracket, a rear furrow wheel, an axle therefor, a wheel mounting member in which said axle is swiveled for castering movement, upper and lower horizontal pivot bosses on said wheel mounting member, parallel link mechanism for movably connecting said wheel mounting member with said bracket comprising upper and lower U-shaped links having their side pivot portions passing through said upper and lower pivot bosses, upper and lower link bars mounted on the projecting ends of said side pivot portions, lifting mechanism comprising a lifting lever pivotally mounted on the front pivot portion of said upper U-shaped link, a lifting link pivotally mounted on the rear pivot portion of said lower U-shaped link, a pivot connecting said lifting lever and lifting link in a toggle joint adapted to pass over center beyond a straight line extending between the pivot centers of said lifting link and lifting lever when said lever is moved rearwardly in a lifting operation, and stops on said bracket and on said wheel mounting member adapted to contact for predetermining the lower position of said plow relatively to said rear furrow wheel when said lever is moved forwardly in a lowering operation.

2. In a plowing implement, the combination of a supporting member, a plow carried thereby, a bracket, bolts passing through said supporting member and bracket, means cooperating with said bolts for securing said bracket to said supporting member in different vertical adjustments, upper and lower horizontal pivot bosses on said bracket, a rear furrow wheel, an axle therefor, a wheel mounting member in which said axle is swiveled for castering movement, upper and lower horizontal pivot bosses on said wheel mounting member, parallel link mechanism for movably connecting said wheel mounting member with said bracket comprising upper and lower U-shaped links having their side pivot portions passing through said upper and lower pivot bosses, upper and lower link bars mounted on the projecting ends of said side pivot portions, lifting mechanism comprising a lifting lever pivotally mounted on the front pivot portion of said upper U-shaped link, a lifting link pivotally mounted on the rear pivot portion of said lower U-shaped link, a pivot connecting said lifting lever and link in a toggle joint adapted to pass over center beyond a straight line extending between the pivot centers of said lifting link and lever when said lever is moved rearwardly in a lifting operation, and stops on said bracket and on said wheel mounting member adapted to contact for predetermining the lower position of said plow relatively to said rear furrow wheel when said lever is moved forwardly in the lowering operation.

3. In a plowing implement, the combination of a supporting member, a plow carried thereby, a bracket, means adjustably mounting said bracket on said supporting member, upper and lower horizontal pivot bosses on said bracket, a rear furrow wheel, an axle therefor, a wheel mounting member in which said axle is swiveled for castering movement, upper and lower horizontal pivot bosses on said wheel mounting member, parallel link mechanism for movably connecting said wheel mounting member with said bracket comprising upper and lower U-shaped links having their side pivot portions passing through said upper and lower pivot bosses, upper and lower link bars mounted on the projecting ends of said pivot portions, lifting mechanism comprising a lifting lever pivotally mounted on the front pivot portion of said upper U-shaped link, a lifting link pivotally mounted on the rear pivot portion of said lower U-shaped link, and a pivot connecting said lifting lever and link in a toggle joint adapted to pass over center beyond a straight line extending between the pivot centers of said lifting link and lever when said lever is moved rearwardly in a lifting operation.

4. In a plowing implement, the combination of a supporting member, a plow carried thereby, upper and lower horizontal pivot bosses carried by said supporting member, a rear furrow wheel, an axle therefor, a wheel mounting member in which said axle is swiveled for castering movement, upper and lower horizontal pivot bosses on said wheel mounting member, parallel link mechanism for movably connecting said wheel mounting member with said supporting member comprising upper and lower U-shaped links having side pivot portions passing through said upper and lower pivot bosses, upper and lower link bars mounted on the projecting ends of said side pivot portions, lifting mechanism comprising a lifting lever pivotally mounted on said supporting member, a lifting link pivotally mounted on said wheel mounting member, and a pivot connecting said lifting lever and link in a toggle joint adapted to pass over center when said lifting lever is moved rearwardly in a lifting operation.

5. In a plowing implement, the combination of a supporting member, a plow carried thereby, upper and lower horizontal pivot bosses carried by said supporting member, a rear furrow wheel, an axle therefor, a wheel mounting member in which said axle is swiveled for castering movement, upper and lower horizontal pivot bosses on said wheel mounting member, parallel link mechanism for movably connecting said wheel mounting member with said supporting member comprising upper and lower U-shaped links having their side pivot portions passing through said upper and lower pivot bosses, upper and lower link bars mounted on the projecting ends of said side pivot portions, lifting mechanism comprising a lifting lever pivotally mounted on one of said members, a lifting link pivotally mounted on the other of said members, and a pivot connecting said lifting lever and link in a toggle joint adapted to pass over center into locking position when said lever is moved in a lifting operation.

6. In a plowing implement, the combination of a supporting member, a plow carried thereby, upper and lower horizontal pivot bosses carried by said supporting member, a rear furrow wheel, an axle therefor, a wheel mounting member in which said axle is swiveled for castering movement, upper and lower horizontal pivot bosses on said wheel mounting member, parallel link mechanism for movably connecting said wheel mounting member with said bracket comprising upper and lower U-shaped links having their side pivot portions passing through said upper and lower pivot bosses, upper and lower link bars mounted on the projecting ends of said side pivot portions, and toggle link lifting mechanism for raising and lowering the rear portion of said supporting member relatively to said rear furrow wheel.

7. In a plowing implement, the combination of a supporting member, a plow carried thereby, upper and lower horizontal pivot bosses carried by said supporting member, a rear furrow wheel, an axle therefor, a wheel mounting member in which said axle is swiveled for castering movement, upper and lower horizontal pivot bosses on said wheel mounting member, parallel link mechanism for movably connecting said wheel mounting member with said bracket comprising upper and lower U-shaped links having their side pivot portions passing through said upper and lower pivot bosses, upper and lower link bars mounted on the projecting ends of said pivot portions, and lifting mechanism pivotally mounted on the side pivot portions of said U-shaped links and operating to raise and lower the rear portion of said supporting member relatively to said rear furrow wheel.

8. In a plowing implement, the combination of a supporting member, a plow carried thereby, upper and lower horizontal pivot bosses carried by said supporting member, a rear furrow wheel, and axle therefor, a wheel mounting member in which said axle is swiveled for castering movement, upper and lower horizontal pivot bosses on said wheel mounting member, and parallel link mechanism for movably connecting said wheel mounting member with said supporting member comprising pivot portions extending through said pivot bosses, link portions extending between said pivot portions at opposite ends of said pivot bosses, and toggle link mechanism connected between said members for raising said plow relatively to said rear furrow wheel.

9. In a plowing implement, the combination of a supporting member, a plow carried thereby, upper and lower pivot bosses carried by said supporting member, a rear furrow wheel, an axle therefor, a wheel mounting member in which said axle is swiveled for castering movement, upper and lower pivot bosses on said wheel mounting member, upper and lower pairs of parellel links pivotally connecting said bosses at opposite ends thereof, and toggle link lifting mechanism for raising the rear portion of said supporting member relatively to said rear furrow wheel.

10. In a plowing implement, the combination of a supporting member, a plow carried thereby, upper and lower pivot bosses carried by said supporting member, a rear furrow wheel, a wheel mounting member therefor, upper and lower pivot bosses on said wheel mounting member, parallel link mechanism for movably connecting said wheel mounting member with said supporting member comprising pairs of upper and lower parallel links pivotally connected with said bosses and extending therebetween at opposite ends of the bosses, and toggle link lifting mechanism for raising the rear portion of said supporting member relatively to said rear furrow wheel.

11. In an implement of the class described, the combination of a supporting member, an agricultural implement carried thereby, upper and lower horizontal pivot bosses carried by said supporting member, a wheel, a wheel mounting member, upper and lower horizontal pivot bosses on said wheel mounting member, parallel link mechanism for movably connecting said wheel mounting member with said supporting member comprising upper and lower U-shaped links having their side pivot portions passing through said upper and lower pivot bosses, and toggle link lifting mechanism for raising the rear portion of said supporting member relatively to said wheel.

12. In a plowing implement, the combination of a supporting member, a plow carried thereby, a rear furrow wheel, an axle therefor, a wheel mounting member in which said axle is swiveled for castering movement, parallel link mechanism movably connecting said wheel mounting member with said supporting member, and lifting mechanism comprising a lifting lever pivotally mounted on said supporting member, a lifting link pivotally mounted on said wheel mounting member, and a pivot connecting said lifting lever and link in a toggle joint adapted to pass over center beyond a straight line extending between the pivot centers of said lifting link and lever when said lever is actuated in a lifting operation.

13. In a plowing implement, the combination of a supporting member, a plow carried thereby, a rear furrow wheel, an axle therefor, a wheel mounting member in which said axle is swiveled for castering movement, link mechanism movably connecting said wheel mounting member with said supporting member, and lifting mechanism comprising a lifting lever pivotally mounted on one of said members, a lifting link pivotally mounted on the other of said members, and a pivot connecting said lifting link and lever in a toggle joint adapted to pass over center beyond a straight line extending between the pivot centers of said lifting link and lever when said lever is actuated in a lifting operation.

14. In a plowing implement, the combination of a supporting member, a plow carried thereby, a rear furrow wheel, an axle therefor, a mounting member for said axle, parallel link mechanism connecting said mounting member with said supporting member, and toggle link mechanism connected between said members for raising said plow relatively to said rear furrow wheel.

15. In a plowing implement, the combination of a supporting member, a plow carried thereby, a rear furrow wheel, an axle therefor, a mounting member for said axle, vertically spaced links pivotally connecting said mounting member with said supporting member, and toggle link mechanism connected between said members for raising said plow relatively to said rear furrow wheel.

16. In an implement of the class described, the combination of a supporting member, an agricultural implement carried thereby, a wheel, a mounting member for said wheel, multiple link mechanism connecting said mounting member with said supporting member, and toggle link mechanism connected between said members for raising said agricultural implement relatively to said wheel.

17. In an implement, the combination of a supporting member, an agricultural implement carried thereby, a wheel, a mounting member for said wheel, a pair of links pivotally connecting said mounting member with said supporting member, and toggle link mechanism connected for raising said supporting member relatively to said wheel.

18. In a plowing implement, the combination of a supporting member, a plow carried thereby, a rear furrow wheel, an axle therefor, a mounting member for said axle, said mounting member being pivotally connected with said supporting member, and lifting mechanism comprising a lifting lever pivotally mounted on one of said members, a lifting link pivotally mounted on the other of said members, and a pivot connecting said lifting lever and link in a toggle joint adapted to pass over center into locking position when said lever is moved in a lifting operation.

19. In an implement of the class described, the combination of a supporting member, an agricultural implement carried thereby, a wheel, a wheel mounting member, means pivotally connecting said wheel mounting member with said supporting member, and lifting mechanism comprising two links connected with said members, and a pivot connecting said links in a toggle joint adapted to pass over center into locking position when said links are moved in a lifting operation, whereby to lock the implement in its elevated position.

In witness whereof, I hereunto subscribe my name this 6th day of November, 1928.

CARL G. STRANDLUND.